Dec. 16, 1930.  W. W. ODELL  1,785,645

APPARATUS FOR CARBONIZING AND DISTILLING CARBONACEOUS MATERIALS

Filed Oct. 17, 1924  2 Sheets-Sheet 1

Inventor
William W. Odell.
By Munson H. Lane
Attorney

Dec. 16, 1930.    W. W. ODELL    1,785,645
APPARATUS FOR CARBONIZING AND DISTILLING CARBONACEOUS MATERIALS
Filed Oct. 17, 1924    2 Sheets-Sheet 2

Inventor
William W. Odell.

By Munson H. Lane.

Attorney

Patented Dec. 16, 1930

1,785,645

UNITED STATES PATENT OFFICE

WILLIAM W. ODELL, OF MINNEAPOLIS, MINNESOTA, ASSIGNOR, BY MESNE ASSIGNMENTS, TO NORTHERN LIGNITE COAL COMPANY, OF CHICAGO, ILLINOIS, A CORPORATION OF DELAWARE

APPARATUS FOR CARBONIZING AND DISTILLING CARBONACEOUS MATERIALS

Application filed October 17, 1924, Serial No. 744,143, and in Canada May 30, 1924.

The invention relates to an apparatus for carbonizing or distilling materials by a continuous process wherein the materials are caused to pass through a hot zone—fire zone— in an opposite direction to the path of the gaseous products of combustion, which latter pass directly through the materials in process.

The objects of this invention are:

1. To render the carbonizing process cheaper,
2. To increase the capacity for a given size installation,
3. To render the process simple of operation,
4. To afford an easy means of discharging the carbonized product,
5. To afford a cheap means of cooling and quenching the carbonized product,
6. To provide a means of burning some of the gas liberated, in contact with the material in process, so as to economize fuel and hasten the carbonization,
7. To provide a means for transferring heat from the hottest particles from carbonization to those less hot, after passing through the hot zones.
8. To provide a means of recovering some of the gas resulting from and during processing,
9. To provide a means for maintaining the mass of material in a loose rather than compact condition during processing and for promoting a mixing of the particles.
10. To process raw green lignite and the like in one step without previous drying.

In carbonizing coal, lignite, and the like, it has been the practice to burn gas in heating flues and utilize only the heat which passes through a wall of refractory material; the slow rate of heating occasioned by the use of these walls retards the process and makes it more costly, not only from a fuel consumption standpoint, but because of the costliness of the apparatus and necessary appurtenances.

In my apparatus I create a condition of combustion within the mass of the material in process, conducting the material in one direction through the hot zone and conducting the gases of combustion in the opposite direction through the material, passing same out through the incoming cooler material. The hot zone is limited to a definite area, and the material is caused to pass through it so quickly that only a very small percentage of the fixed carbon is consumed in processing.

In the drawings are shown several illustrative embodiments of the invention wherein:—

Figure 1:
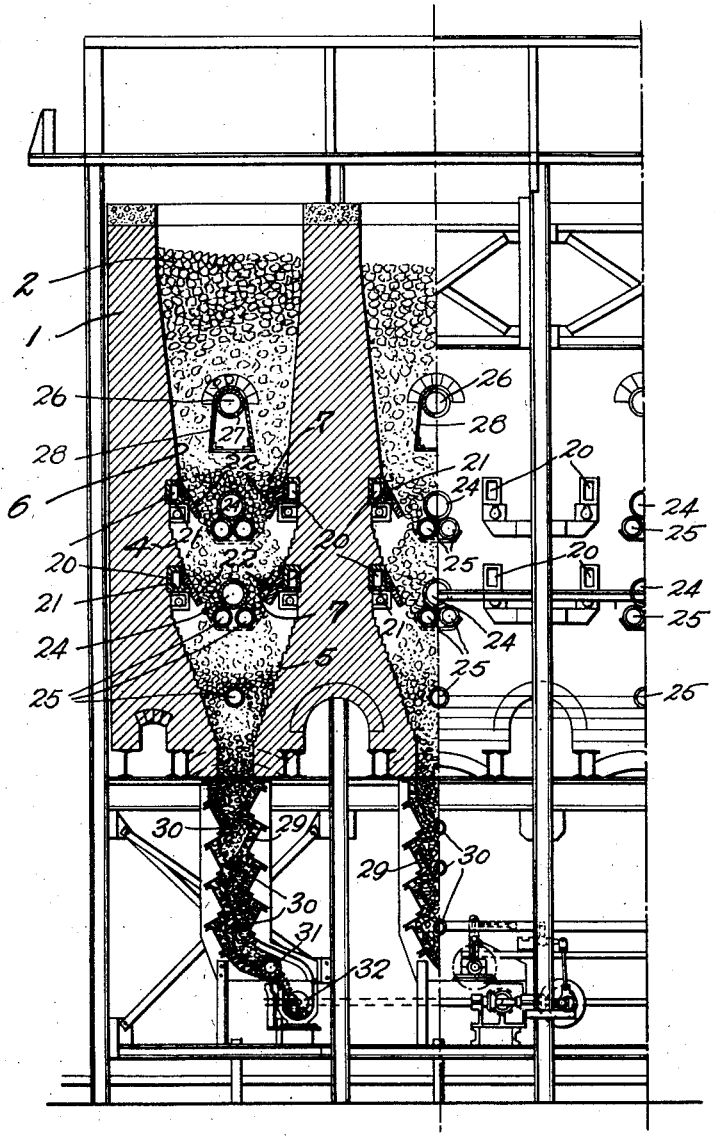
Figure 1 is a view partly in front vertical section and partly in elevation, in which metal air ducts are embedded in the brickwork of the carbonizer, and in which instantly replaceable metal baffles are provided which extend into the fuel bed from without, and in which the baffles are supported by the air ducts or tuyères.
Figure 2:
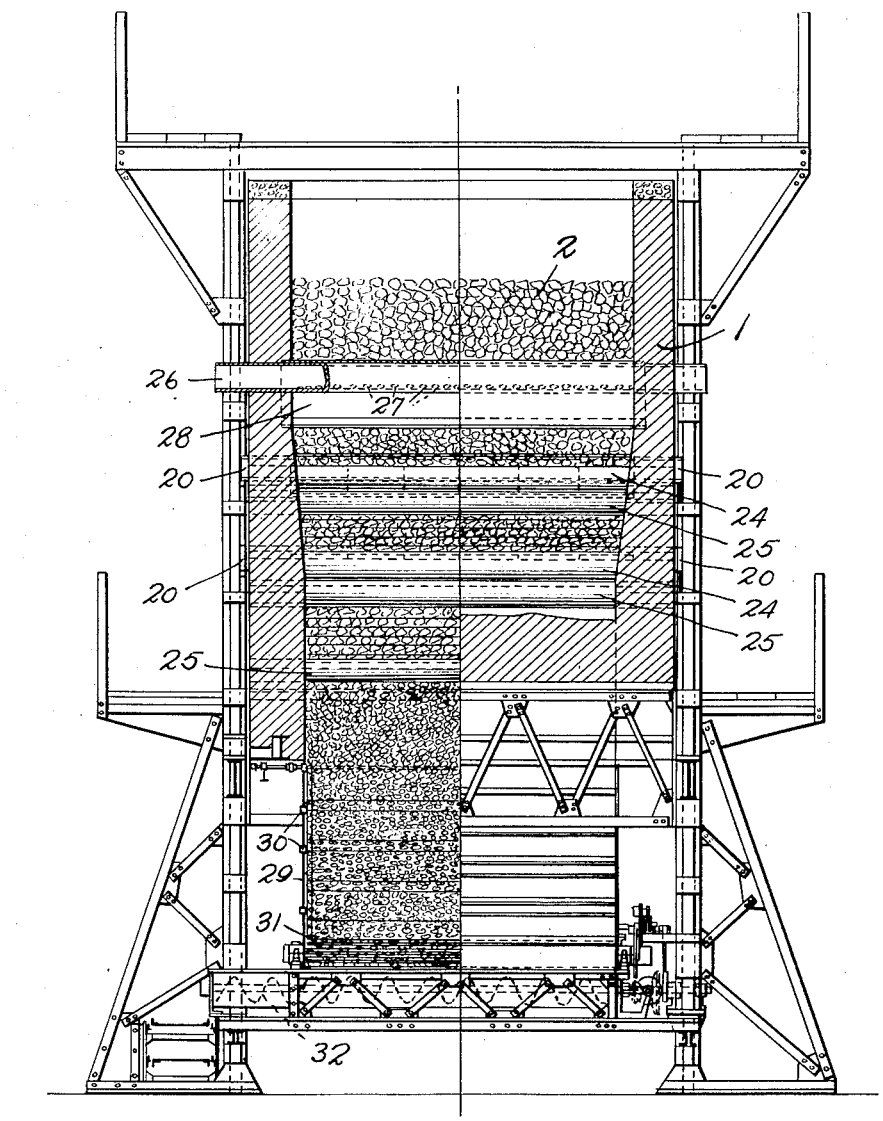
Figure 2 is a side view, partly in vertical section and partly in elevation.

Referring to the drawings the numeral 1 indicates the oven wall and the numeral 2 the mass of material in process. The upper portion of the interior walls of the oven are shown as convergent as at 6, in a downward direction. Certain portions of these walls are also shown as downwardly converged, respectively at 4 and 5. Narrow zones generally respectively indicated at 6—7 are provided. A plurality of metal air dutcs 20 are embedded in the walls of the carbonizer at a plurality of different levels. These ducts or tuyères are horizontally arranged and each is provided on the underside with a plurality of inlet openings 21, the openings preferably being arranged at regular intervals. This arrangement provides for uniform distribution of air to the carbonizer. Preferably a small amount of steam is admitted with air for the purpose of reducing the temperature thus lengthening the life of the apparatus and improving the quality of the gas made. The walls are formed to provide alternately enlarged and constricted zones, and the ducts are placed as shown substantially at the junction point of these zones.

Figure 3:
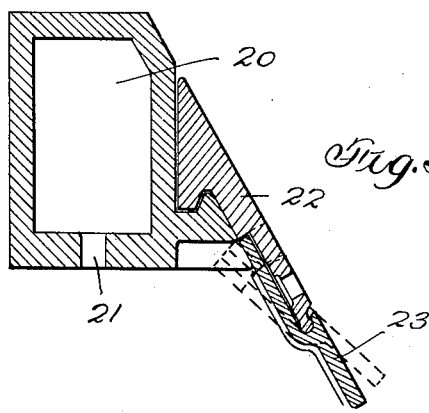
Figure 3 is a sectional detail view on an enlarged scale showing the baffle provided with a replaceable tip.
Figure 4:
Figure 4 is a perspective view of the tip.

Middle baffles 22 are provided extending into the fuel from the outer wall. This arrangement provides a narrow internal zone in which clinkers cannot form since they do not stick to the metal baffles. These external baffles have the form of plates preferably suspended from the air ducts 20, as clearly shown in Figure 3. Since the life of these plates is comparatively short, generally from three to five months, if cast iron is used, replaceable tips 23 are provided, see Figures 3 and 4. These tips are preferably composed of metal more resistant to heat than the rest of the plate. For the internal baffles ordinary cast iron piping may be used, as shown at 24—25.

The gas offtake pipe is shown at 26, and is provided with openings 27 communicating with the interior of the fuel bed. A hood 28 is arranged over the offtake pipe as shown, to prevent air from being drawn inwardly from above, and allowing a large area of loose fuel for the gases to pass through from the hot zones. This arrangement also prevents jamming of the fuel in the hot zones. The gas take-off pipe is located preferably above the upper central internal baffle 24, but at a substantial distance below the upper surface of the fuel.

The coke or char passes downwardly from the oven through a staggered step-like course, illustrated at 29, which is constantly exposed to the air. Steam is admitted to the char through pipes 30 arranged at intervals along the staggered course.

The coke is removed by means of paddles 31 operated by any suitable mechanism and the coke is delivered to a screw conveyor 32, or the like.

Each internal baffle is in this instance formed by elements 24—25, and these elements are arranged substantially as shown to divide the charge in a constricted zone substantially defined by elements 22.

In operating, the carburetor or oven is filled with crushed or small sized fuel up to the first baffle or tuyère. The fire is started at this level by igniting wood or other combustible, and then more fuel is added and the air blast is started through the lower tuyère 20. More fuel is now added, and the ignition process is repeated at the upper tuyère, and air is admitted through the upper tuyère 20. The fuel is then built up to a level above the element 26 substantially as shown at 10. The discharge mechanism 31 is then started and fuel is added to the top of the oven at as frequent intervals as is required. Fuel passes through the hot zone indicated at 8, and the gases evolved during the process pass upwardly through the fuel bed 2, and are in part burned within the fuel bed, the remainder is burned at the fuel surface 10. The air blast through the tuyères is maintained throughout the operation.

I find that with a given quantity of air blast through the upper and lower tuyères 20, the degree of carbonization is controlled by the velocity of travel of the fuel—(the quantity of material put through the process per unit of time)—and that for a given rate of fuel input, the degree of carbonization is dependent upon the quantity of the air injected at the tuyères. The carbonization is more complete as the rate of travel of the fuel is decreased and as the quantity of air injected at the tuyères is increased, and vice versa. At no time is the fuel discharge faster than the state of ignition can be maintained at the tuyères.

It will be noted that the air is blown into the mass of downwardly moving ignited fuel at a plurality of levels, causing incomplete combustion to take place at these levels. The resulting gas is caused to pass upwardly from these zones of incomplete combustion and is collected in the gas offtake pipe 26, from which it may be delivered to a suitable gasholder. By the arrangement of external and internal baffles as shown, a thorough mixing of the particles of fuel takes place so that the quality of the coke or char, and of the gas is relatively uniform. It will also be noted that the carbonized product is cooled by means of the exposed metal surface 29, and the steam which it encounters in its staggered downward course, before being finally discharged from the oven.

When lignite is passed through the apparatus, the resulting residue will be a partly dried or thoroughly dry (water free) lignite, or a carbonized product containing volatile matter ranging from that of the thoroughly dried lignite to almost zero, accordingly as the rate of discharge is fast or slow. Partly dried peat blocks have been successfully carbonized in this manner, and likewise wood and mixed fuels have been successfully treated thus.

Attempts have been made to utilize the producer gas generating principles in carbonizing materials, by passing the fuel rapidly through the producer, and such attempts have not been successful, because the percentage of fuel consumed was high and the carbonization uneven. I have found by experiment with large size apparatus that in order to carbonize with a small consumption of fixed carbon, utilizing largely the gas evolved to generate the heat required, it is necessary that the fuel must pass through the hot zone where air is admitted, very rapidly. This I believe to be new, and is a feature of my process and of the oven which provides the means. When the fuel moves slowly past the tuyères, considerable fixed carbon is always burned. I have carbonized lignite in the oven shown with a fixed carbon consumption, during processing, of less than five per cent of the original lignite. I have found further that passing fuels containing a high percentage of moisture so rapidly through a single hot zone will not produce a well carbonized product.

In other words, passing the fuel rapidly through at least two hot zones in succession (preferably one above the other as shown) with a slower rate of travel between these zones wherein the particles in process change position with respect to each other, the hotter giving up heat to the cooler, produces a more uniform product, and results in a decrease in the percentage of fixed carbon consumed. This I believe to be a new feature in carbonizing processes.

Since gas will burn preferentially to carbon when air is admitted in the presence of both at the temperature prevailing, I am enabled to burn considerable of this gas in the upper combustion zones (gas which is chiefly liberated below). A further advantage gained by a rapid travel of the fuel through the hot zones is that the reaction $CO_2 - C = 2CO$, which takes place rapidly only at high temperatures, does not take place to the same extent that it otherwise would, thus again reducing the fixed carbon consumption.

Now since it is difficult to heat a mass of fuel of any appreciable thickness by air blasting—that fuel nearest the air supply always becoming intensely heated first—I have found it necessary to carbonize by supplying the heat to thin layers at a time, and accordingly have used this as a means of producing a high velocity of travel of the fuel in the hot zones; that is, by placing the tuyères in the narrow portions of the oven. This combination I believe to be new and novel.

The elements 24 are so placed that they act as baffles which permit of a certain amount of mixing of the particles after they pass, and in passing the tuyères or ducts 20. Means is thus provided for the hottest particles to commingle with the cooler ones, and give up some of their sensible heat to the latter; the fuel mass is considerably larger at these locations indicated at 8, and the rate of linear travel is slower thus allowing sufficient time for heat transfer and completion of carbonization. Considerable gas is evolved during this heat transfer in the widened portions 8 (below the tuyères), and since it cannot escape elsewhere it is forced upwardly and reaches a maximum velocity in the restricted portions 6 of the oven, adjacent the tuyères, more particularly the uppermost zone 6. This is a particularly desirable feature, since it is decidedly preferable to burn gas rather than to burn carbon, and to use more air through the upper tuyères 20. There is an excess of gas produced when carbonizing from materials such as lignite, peat, coal, etc., and I prefer to burn some of this at the surface 10 of the fuel bed, for it is an aid in carbonizing.

I provide means for withdrawing some of the gas from the lowermost pipe 25. This pipe has holes in its lower side and conducts said gas at this level when carbonizing lignite or coal at 180 to 240 B. t. u. If a large amount of gas is removed, producer gas is generated, and the heating value of the total gas removed will depend upon how much producer gas is made. The producer gas so made has a heating value of 140 B. t. u. per cubic foot. When just sufficient gas is removed to operate the machinery for supplying the oven with air and power, its heating value is approximately 200 B. t. u. per cubic foot. With peat it is slightly higher than this.

I have found that the quantity of steam or water required for quenching the carbonized product is very much less than the calculated amount, indicating carbonization by heat transfer between the particles in the oven at zones 8. This heat transfer process aids materially in the cooling and quenching of the finished product, which is completely cooled by admitting exhaust steam through the pipes 30. Water may be used in place of steam, but steam is preferable since a slight excess of water impedes the flow of the residue and alters the angle of repose of the material. The residue (carbonated product) is cooled, it will be noted, in a mixed atmosphere of gas and steam in which there is no free oxygen. This apparently is a big advantage, for the product discharged, even though warm, does not take fire spontaneously in the air, which is not the case when some of the said carbonized materials are quenched with water in the air.

The operation of this oven is automatic when fuel is supplied and the residue removed, and hence the labor cost for operating is low. There are no complicated flue settings or other complications in the design of the oven which require specialists for the latter's construction. This oven is "get-at-able", and can be readily repaired when occasion requires it. The first cost obviously is relatively low. It can be started and shut down frequently without damage, which is not true of ovens with complicated flue settings. I have completely carbonized as much as 20 tons of lignite per 24 hours in this oven (inside oven dimensions being: 6 feet long and 3 feet wide in the widest portion), the lignite charged contained 30 per cent moisture and was crushed to sizes less than two inches in diameter. The air pressure used to obtain this capacity was less than two inches of water by a water manometer. The carbonized product amounting to slightly more than 40 per cent of the original lignite was suitable for briquetting, or for burning as such.

The means of discharge, which I believe to be new, consists of a rotating drum 31 with radial blades, upon which the cool carbonized product flows because of the tendency of the material to assume a rather definite angle of repose. The quantity removed per unit of time depending upon the speed of the rotating drum. Advantages claimed are that the discharge mechanism is always in sight, does not become over-heated and can be readily repaired, and its operation is visible.

I claim:—

1. A vertical apparatus for carbonizing and distilling solid carbonaceous materials providing a vertically disposed passage, and a plurality of air ducts arranged in horizontal pairs at different levels, with the ducts of the pairs on opposite walls of the passage, each duct being partially embedded in the wall with one side flush with the inner surface of the passage and each having a bottom portion which overhangs the passage, which overhanging portion has discharge openings communicating with the passage.

2. A vertical apparatus for carbonizing and distilling solid carbonaceous materials providing a vertically disposed passage and a plurality of tuyères arranged in horizontal pairs at different levels, the ducts of the pairs being on opposite walls of the passage, and each being partially embedded, and having discharge openings communicating with the passage, and a baffle detachably supported by each tuyère, and extending inwardly, and cooperating to constrict the passage.

3. A vertical apparatus for carbonizing and distilling solid carbonaceous materials providing a vertically disposed passage and a plurality of tuyères arranged in horizontal pairs at different levels, the ducts of the pairs being opposingly related on opposite walls of the passage and having discharge openings communicating with the passage, and a baffle detachably supported by each tuyère and extending inwardly, and co-operating to constrict the passage, and baffles arranged in the passage between the oppositively paired baffled tuyères to divide a downwardly traveling charge in the constricted portion of the passage, the said inwardly extending baffles cooperating with the centrally located baffles to reduce its thickness.

4. A vertical apparatus for carbonizing and distilling solid carbonaceous materials providing a vertically disposed passage and a plurality of metallic tuyères arranged in horizontal pairs at different levels, the ducts of the pairs being opposingly related on opposite walls of the passage and each being partially embedded, and having discharge openings communicating with the passage, and a baffle supported by each tuyère and extending inwardly, and cooperating to constrict the passage, said inwardly extending baffles comprising plates detachably secured to the tuyères, and said baffles having removable tip portions and internal baffles cooperating with said plates to divide the charge and reduce its thickness.

5. A vertical apparatus for carbonizing and distilling solid carbonaceous materials providing a vertically disposed passage and a plurality of metallic tuyères arranged in horizontal pairs at different levels, the ducts of the pairs being on opposite walls of the passage, and each being partially embedded, and having discharge openings communicating with the passage, and a baffle plate detachably supported by each tuyère and extending inwardly, and cooperating to constrict the passage, each plate having a removable tip as an extension of its inner surface.

6. A vertical apparatus for carbonizing and distilling solid carbonaceous materials providing a vertically disposed passage and a plurality of metallic tuyères arranged in horizontal pairs at different levels, the ducts of the pairs being on opposite walls of the passage and each being partially embedded, and having discharge openings communicating with the passage, and a baffle supported by each tuyère and extending inwardly and cooperating to constrict the passage, and a gas take-off pipe located above the tuyères and extending in the same direction as the tuyères and having openings in its under side, and a hood partly surrounding the pipe and extending downwardly towards the tuyères, to provide for removal of the gas at a point at a level below the bottom of the pipe.

7. A vertical apparatus for carbonizing and distilling solid carbonaceous materials providing a vertically disposed passage the walls of which are arranged to provide a series of superposed downwardly convergently tapered chambers, the passage being open at the top to the atmosphere, metallic ducts arranged in horizontal pairs at different levels and at the most constricted portion of each chamber, the ducts of the pairs being on opposite walls of the passage, and each being partially embedded, baffle plates removably supported by the ducts and extending towards one another in pairs inwardly and downwardly, and baffles in the passage between the oppositively spaced baffled tuyères to constrict the passage, divide the charge and reduce its thickness at the upper portion of the underlying chamber.

8. A vertical apparatus for carbonizing and distilling solid carbonaceous materials providing a vertically disposed passage, a plurality of ducts arranged in horizontal pairs, the ducts being in opposite walls of the passage, and each being partially embedded and having an inner face substantially flush with the surface of the passage, and having its lower face overhanging the passage, said ducts having openings in their lower faces leading into the passage, each duct having an inwardly directed extension attached to the inner face with the extensions slanting inwardly and downwardly.

9. A vertical apparatus for carbonizing and distilling solid carbonaceous materials providing a vertically disposed passage having an upper portion convergently tapering downwardly, a pair of horizontally disposed ducts embedded in the walls in opposingly spaced relation and having discharge openings communicating with the passage, plates detachably carried by the ducts and arranged to constrict the passage substantially at the lowermost level of the tapered portion, the walls of said passage below said ducts being also tapered convergently downwardly, to provide a chamber arranged to permit expansion of a downwardly moving charge after passing the plates, a second pair of ducts and plates arranged in the chamber in the manner of the first mentioned pair, the walls below this second pair being convergently tapered downwardly, and means centrally of each pair of plates for further restricting the charge and dividing it.

10. A vertical apparatus for carbonizing and distilling solid carbonaceous materials providing a vertically disposed passage having its walls interiorly formed to provide superposed alternately laterally enlarged and constricted chambers, for causing alternate lateral expansion and contraction of a charge traveling downwardly through the passage, and tubular elements axially horizontally arranged as a wedge in each constricted chamber to divide the charge, the arrangement being such that after division of the charge the divided parts are caused to unite and expand in the enlarged chambers.

11. A vertical apparatus for carbonizing and distilling solid carbonaceous materials providing a vertically disposed passage having its walls interiorly formed to provide superposed alternately laterally enlarged and constricted chambers for causing alternate lateral expansion and contraction of a charge moving continuously downwardly through the passage, and tubular elements arranged as a wedge to divide the charge, and said elements lying across the dividing line between the chambers.

12. A vertical apparatus for carbonizing and distilling solid carbonaceous materials providing a vertically disposed passage having its walls interiorly formed to provide superposed alternately laterally enlarged and constricted chambers for causing alternate lateral expansion and contraction of a charge moving downwardly through the passage, means arranged in each constricted chamber to divide the charge, metallic air ducts partially embedded in the walls at each constricted portion and horizontally arranged in pairs the members of which are opposingly related, a baffle plate detachably supported by each duct and extended downwardly and inwardly, and cooperating to constrict the passage, said ducts having openings delivering in a direction substantially towards the enlarged chamber or expanding zone of the charge, and means arranged between the plates, to divide and reduce the thickness of the charge.

13. A vertical apparatus for carbonizing and distilling solid carbonaceous materials providing a vertically disposed passage having its walls interiorly formed to provide superposed alternately laterally enlarged and constricted chambers for causing alternate lateral expansion and contraction of a charge moving downwardly through the passage, means arranged in each constricted chamber to divide the charge, metallic air ducts partially embedded in the walls at each constricted portion and horizontally arranged in pairs the members of which are opposingly related, a baffle plate detachably supported by each duct and extended downwardly and inwardly, and cooperating with the dividing means to constrict the passage, said ducts having openings delivering in a direction substantially towards the enlarged chamber or expanding zone of the charge, and a gas take-off pipe arranged above and adjacent the uppermost dividing means.

14. A vertical apparatus for carbonizing and distilling solid carbonaceous materials having an upright chamber having its interior walls formed to provide downwardly convergently tapered chambers, air ducts partially embedded in the walls at the narrowest point and arranged in pairs the members of which are opposingly related, a baffle plate supported by each duct and extending downwardly and inwardly and cooperating to constrict the chamber, and dividing elements arranged intermediately of and parallel with each pair of plates and in spaced relation thereto to further constrict the constricted portions of the chamber, and cause a division of the charge, the arrangement being such that after division of the charge the divided portions are allowed to combine and expand, the ducts having openings arranged to deliver downwardly between the chamber wall and the coresponding baffle plate.

In testimony whereof, I affix my signature.

WILLIAM W. ODELL.